United States Patent [19]

Okumura et al.

[11] 4,180,835
[45] Dec. 25, 1979

[54] MAGNETIC ERASING HEAD WITH GAPS UTILIZING HIGH FLUX DENSITY AND HIGH PERMEABILITY

[75] Inventors: Haruhiko Okumura, Miyagi; Masanori Kanaya, Tagajyo, both of Japan

[73] Assignee: Sony Corporation, Tokyo, Japan

[21] Appl. No.: 912,832

[22] Filed: Jun. 5, 1978

[30] Foreign Application Priority Data

Jun. 9, 1977 [JP] Japan ................... 52-68317

[51] Int. Cl.$^2$ ................... G11B 5/251; G11B 5/27
[52] U.S. Cl. ................... 360/118; 360/120; 360/121
[58] Field of Search ............... 360/118, 119, 120, 121, 360/122, 125, 126

[56] References Cited

U.S. PATENT DOCUMENTS

| | | | |
|---|---|---|---|
| 2,535,712 | 12/1950 | Wolfe | 360/118 |
| 2,702,835 | 2/1955 | Camras | 360/118 |
| 3,098,126 | 7/1963 | Kaspaul | 360/120 |
| 3,246,384 | 4/1966 | Vice | 360/120 |
| 3,449,529 | 6/1969 | Camras | 360/118 |
| 3,508,014 | 4/1970 | Mersing | 360/120 |
| 3,519,763 | 7/1970 | Lode | 360/120 |
| 3,526,725 | 9/1970 | Camras | 360/118 |
| 3,641,281 | 2/1972 | Varadi et al. | 360/120 |
| 3,882,544 | 5/1975 | Hughes | 360/118 |

*Primary Examiner*—Alfred H. Eddleman
*Attorney, Agent, or Firm*—Hill, Van Santen, Steadman, Chiara & Simpson

[57] ABSTRACT

In a magnetic erasing head having a first gap and a second gap formed respectively between ferrite cores, one or more magnetic material layers (Fe-layers) are arranged in the gaps respectively, and the magnetic material layers have the magnetic flux density ($B_{10}$) of more than 5000 gauss, the permeability of more than 5000 and the thickness of $5\mu$ to $30\mu$.

5 Claims, 18 Drawing Figures

MAGNETIC ERASING HEAD WITH GAPS UTILIZING HIGH FLUX DENSITY AND HIGH PERMEABILITY

BACKGROUND OF THE INVENTION

1. Field of the Invention

This invention relates to a magnetic erasing head, and more particularly to a magnetic erasing head suitable for a magnetic recording medium having high coercive force.

2. Description of the Prior Art

A magnetic recording tape having high coercive force is required for high-density magnetic recording. At the present, an AC magnetic erasing head made of ferrite is usually used for erasing signals recorded on the magnetic recording tape. However, there are such problems in the use of the conventional AC magnetic erasing head that it cannot sufficiently erase the recorded signals from the magnetic recording tape, and that much power should be consumed for erasing the recorded signals by it.

For example, FIG. 1 shows schematically a conventional magentic erasing head 1 of the semi-double gap type, and FIG. 2 shows schematically another conventional magnetic erasing head 2 of the double gap type. The magnetic erasing heads 1 and 2 are made of ferrite. The front surfaces of the magnetic erasing heads 1 and 2 to be contacted with the magnetic recording tape are further worked or polished. However, the front surfaces of the magnetic erasing heads 1 and 2 shown in FIG. 1 and FIG. 2 are not yet worked or polished.

The magnetic erasing head 1 of FIG. 1 includes two core elements 3a and 3b made of ferrite. Two front gaps 5 and 6 are formed between the core elements 3a and 3b. The core elements 3a and 3b are set to each other, for example, by resin material R such as epoxy resin. An erasing coil 9 is wound on the central portion of the one core element 3a.

The other magnetic erasing head 2 of FIG. 2 includes three core elements 4a, 4b and 4c constituting the so-called "E-shape" type, made of ferrite. The core elements 4a, 4b and 4c are integrally formed with each other. Two front gaps 7 and 8 are formed between the side core elements 4a, 4c and the central core element 4b in the magnetic erasing head 2. An erasing coil 10 is would on the central core element 4b.

In FIG. 1 and FIG. 2, the depth of the pole faces of the core elements 3a, 4a and 4c is usually about 300μ. However, FIG. 1 and FIG. 2 do not show the actual size relationships between the parts for facilitation of the understanding. For example, the ratio of the length of the front gap to the depth of the pole face is ½.

When the erasing coils 9 and 10 are energized with AC power, alternating magnetic fluxes are generated in the front gaps 5, 6, 7 and 8. The recorded signals on the magnetic recording tape are erased by the alternating magnetic fluxes of the gaps 5, 6, 7 and 8. The magnetic fluxes are concentrated in the gaps 5, 6, 7 and 8. The magnetic flux densities are higher in the gaps 5, 6, 7 and 8. Particularly, when the recorded signals are erased from the magnetic recording tape having high coercive force by the magnetic erasing head 1 or 2, the magnetic flux density becomes extremely high in the gaps 5 and 6, or 7 and 8. Generally, the saturation magnetic flux density of ferrite material is low. Accordingly, the core elements 3a, 4a and 4c are liable to be saturated with the magnetic fluxes particularly at the edge portions. In the saturation, the amounts of the magnetic fluxes from the core elements 3a, 4a and 4c are supressed, and much electric power is consumed in vain.

SUMMARY OF THE INVENTION

It is an object of the present invention to provide an improved magnetic erasing head.

It is another object of the present invention to provide a magnetic erasing head which can erase signals recorded on a magnetic recording medium having high coercive force.

It is a further object of the present invention to provide a magnetic erasing head which can work efficiently with small electric power. According to one aspect of the present invention, there is provided a magnetic erasing head having a first gap and a second gap formed respectively between ferrite core elements in which one or more magnetic material layers are arranged in the gaps respectively, the magnetic material layers having the magnetic flux density ($B_{10}$) of more than 5000 gauss, the permeability of more than 5000 and the thickness of $5\mu$ to $30\mu$.

Various other objects, advantages and features of the present invention will become readily apparent from the ensuing detail description, and the novel features will be particularly pointed out in the appended claims.

DESCRIPTION OF THE PREFERRED EMBODIMENTS

Figure 1:
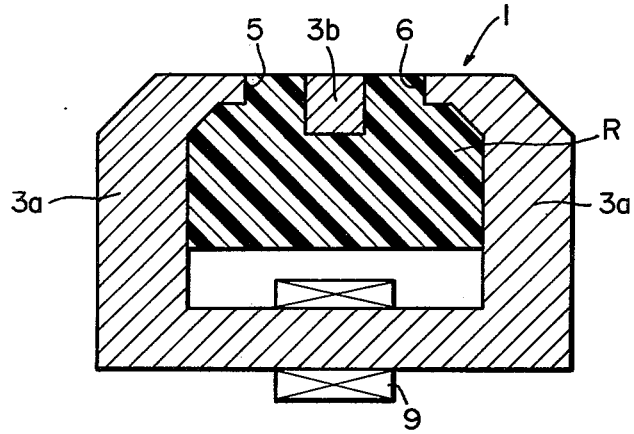
FIG. 1 is a schematic cross-sectional view of a conventional magnetic erasing head of the semi-double gap type.
Figure 2:
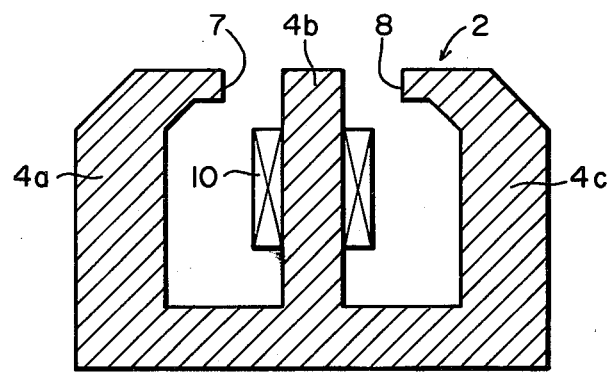
FIG. 2 is a schematic cross-sectional view of another conventional magnetic erasing head of the double gap type.
Figure 3:
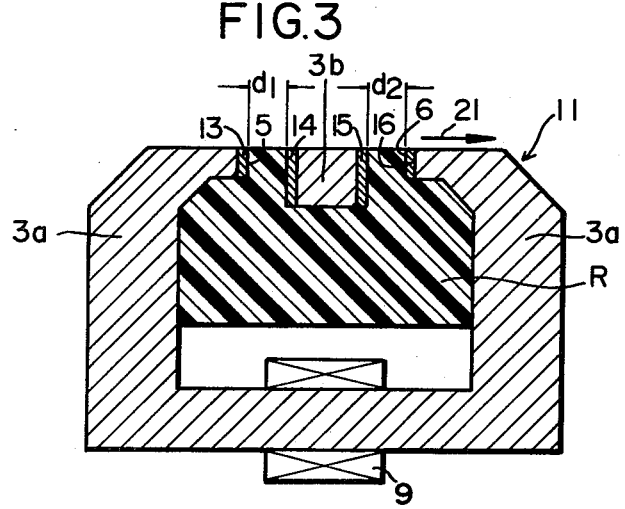
FIG. 3 is a schematic cross-sectional view of a magnetic erasing head of the semi-double gap type according to one embodiment of this invention.
Figure 4:
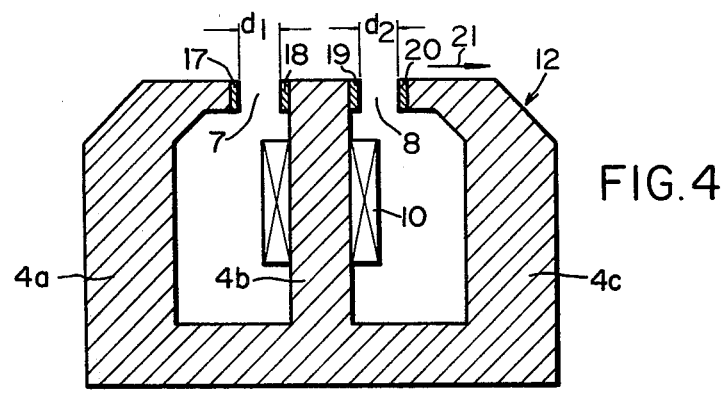
FIG. 4 is a schematic cross-sectional view of a magnetic erasing head of the double gap type according to another embodiment of this invention.

FIG. 3 shows a magnetic erasing head 11 of the semi-double gap type according to one embodiment of this invention. And FIG. 4 shows a magnetic erasing head 12 of the double gap type according to another embodiment of this invention. Parts in these embodiments which correspond to the parts in the conventional magnetic erasing heads 1 and 2 of FIG. 1 and FIG. 2, are denoted by the same reference numerals. The one magnetic erasing head 11 includes the ferrite core elements 3a and 3b, and the erasing coil or winding 9. The front gaps 5 and 6 are formed between the ferrite core elements 3a and 3b. The other magnetic erasing head 12 includes the ferrite side core elements 4a, 4c, the ferrite central core element 4b, and the erasing coil or winding 10. The front gaps 7 and 8 are formed between the ferrite side core elements 4a, 4c and the ferrite central core element 4b. The depth of the pole faces of the core elements 3a, 4a and 4c is about 300μ.

According to this invention, Fe(iron)-layers 13 to 20 having high magnetic flux density ($B_{10}$=15000 gauss) and high permeability ($\mu$=1000) are attached to the pole faces of the core elements 3a and 3b of the magnetic erasing head 11 and of the core elements 4a, 4b and 4c of the other magnetic erasing head 12. The magnetic flux density $B_{10}$ means a magnetic flux density of a magnetic material put in the magnetic field of the intensity of 10 Oe.

The core elements 3a, 3b, 4a, 4b and 4c are made of sintered polycrystalline ferrite which is composed of 33 mol% MnO, 16 mol% ZnO and 51 mol% $F_2O_3$, and the magnetic flux density $B_{10}$ and permeability $\mu_{1KHZ}$ of which are equal to 4500 gauss and 2800, respectively. As shown in FIG. 3 the spaces between the Fe-layers 13, 14, 15 and 16 are filled with resin material R such as epoxy resin, to set the core element 3b. As described hereinafter, the front surfaces of the magnetic erasing heads 11 and 12 are worked or polished to curved surfaces to be contacted with the magnetic tape.

Since the Fe-layers 13 to 20 have high magnetic flux density, the magnetic erasing heads 11 and 12 are effectively prevented from being saturated with magnetic flux at the pole faces. And since the Fe-layers 13 to 20 have high permeability, magnetic flux is concentrated to the Fe-layers 13 to 20. As the results, the defects of the conventional magnetic erasing head are removed. When the magnetic erasing heads 11 and 12 contact with the magnetic recording tape, the magnetic fluxes from the core elements sufficiently reach the magnetic recording tape. Accordingly, the recorded signals are very effectively erased from the magnetic recording tape by the magnetic erasing head of the embodiment of this invention.

Figure 5:
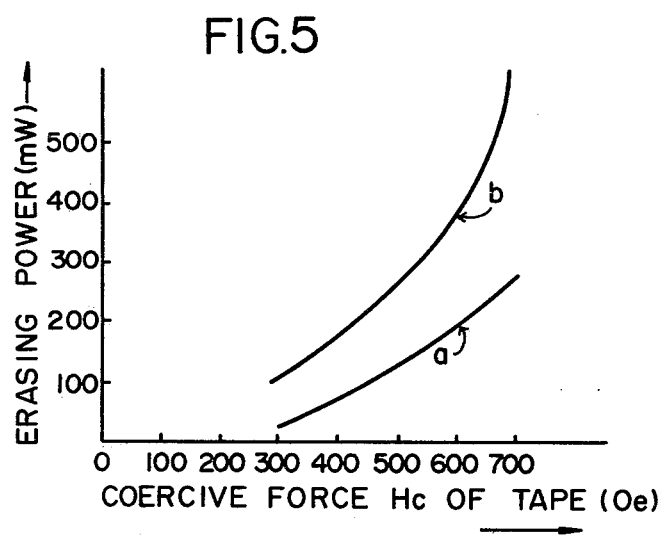
FIG. 5 is a graph showing the relationship between the coercive force Hc of the magnetic tape and the erasing power in which the erasing powers for the conventional magnetic erasing head and the magnetic erasing head of this invention are compared with each other.
Figure 6:
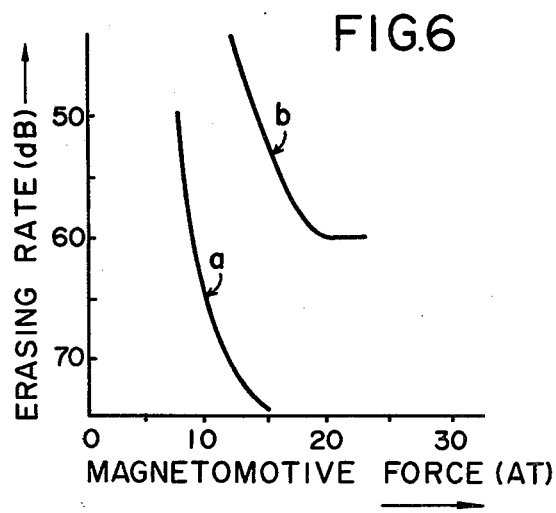
FIG. 6 is a graph showing the relationship between the magnetomotive force (the Ampere Turns) and the erasing rate in which the erasing rates for the conventional magnetic erasing head and the magnetic erasing head of this invention are compared with each other.

The above described effect of the magnetic erasing head according to the embodiment of this invention will be described in more detail with reference to FIG. 5 and FIG. 6. FIG. 5 shows the relationship between the erasing power required for the erasing rate of 65 dB and the coercive force Hc of the magnetic recording tape. In FIG. 5, a curve a shows the characteristic of the magnetic erasing head according to the embodiment of this invention, and another curve b shows the characteristic of the conventional magnetic erasing head. FIG. 6 shows the relationship between the erasing rate for the magnetic recording tape having the coercive force Hc of 700 Oe, and the magnetomotive force or the Ampere Turns (AT). In FIG. 6, a curve a shows the characteristic of the magnetic erasing head according to the embodiment of this invention, and another curce b shows the characteristic of the conventional magnetic erasing head.

From the graphs of FIG. 5 and FIG. 6, it will be understood that too much erasing power or magnetomotive force AT (Ampere x number of turns of the winding) are required for the recorded signals to be erased from the magnetic recording tape having coercive force Hc of 700 Oe at the erasing rate of 65 dB by the conventional magnetic erasing head. On the other hand, the magnetic recording head of the embodiment of this invention requires the further smaller erasing power or magnetomotive force to satisfactorily erase the recorded signals from the magnetic recording tape having so high coersive force Hc as 700 Oe. According, the magnetic erasing head of the embodiment of this invention is superior in performance to the conventional magnetic erasing head. Generally for the standardization of the magnetic erasing head, the erasing power is required to be less than 500 mW and the thermal runaway at which the core of the magnetic erasing head is greatly heated by the erasing current requiring the erasing current to be greatly increased, should be as small as possible. The magnetic erasing head of the embodiment of this invention fulfills sufficiently the requirements of such standardization requirements.

Figure 7:
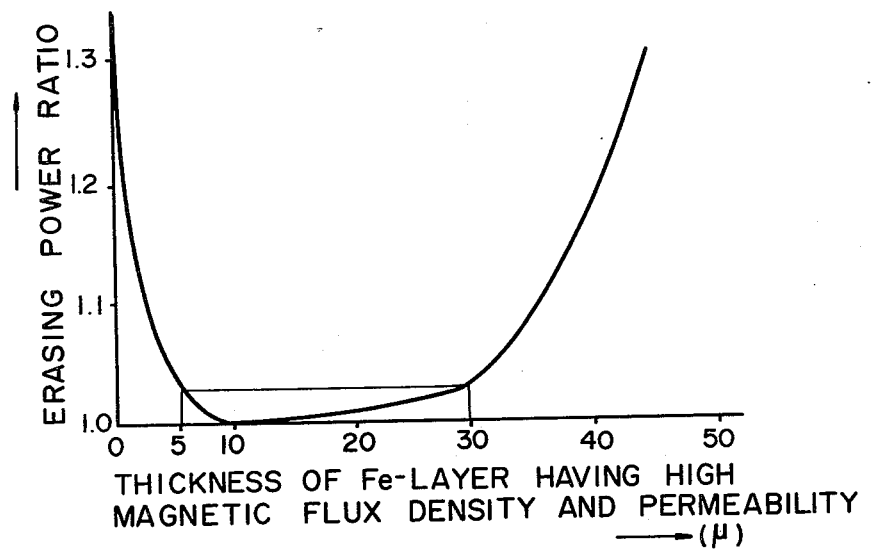
FIG. 7 is a graph showing the relationship between the thickness of the magnetic layer (Fe-layer) having high magnetic flux density and high coercive force and the erasing power ratio.

It has been found that the thickness of the Fe-layers 13 to 20 should be within the range of 5 to 30μ to obtain desirable erasing power and prevent excessive generation of heat. As understood from FIG. 7, when the thicknesses of the Fe-layers 13 to 20 are less than 5μ, or more than 30μ, the erasing power is too great, and the recorded signals cannot be erased from the magnetic recording tape with low erasing power. The reasons are that the magnetic characteristic is deteriorated due to distortion of the Fe-layer in the case of the Fe-layer having the thickness of less than 5μ, and that core loss is increased due to eddy current in the Fe-layer in the case of the Fe-layer having thickness of more than 30μ, particularly when the frequency of the magnetic flux is high, which lowers the permeability and magnetic flux density and decreases and dulls the magnetic flux due to saturation. More preferably, the thickness of the Fe-layer is within the range of 10 to 20μ, since the magnetic flux is more sharply generated from the core elements.

When the Fe-layers 13 to 20 are arranged as shown in FIG. 3 and FIG. 4, the total gap length ($d_1+d_2$) of the front gaps 5 and 6, or 7 and 8 is required to be within the range of 50 to 300μ. Preferably, the total gap length ($d_1+d_2$) is within the range of 140 to 240μ. When the magnetic recording tape to be contacted with the magnetic erasing head 11 or 12 is transported in the direction shown by the arrow 21, it is preferable that the length $d_2$ of the front gap 6 or 8 is larger than the length $d_1$ of the front gap 5 or 7 ($d_1<d_2$). In such a case, the dependency of the frequency on the erasing rate can be reduced.

Next, a manufacturing method of the magnetic erasing head of FIG. 4 will be described with reference to FIG. 8A to FIG. 8D and FIG. 9A to FIG. 9C.

Figure 8A:
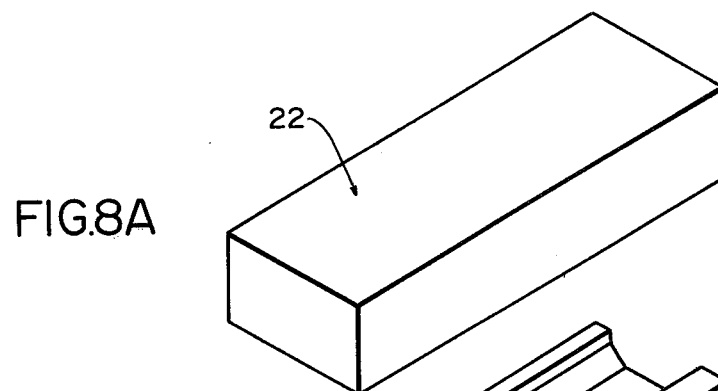
FIG. 8A to FIG. 8D are perspective views showing the manufacturing method of a side core element for the magnetic erasing head in the order of the sequential manufacturing steps.
Figure 8B:
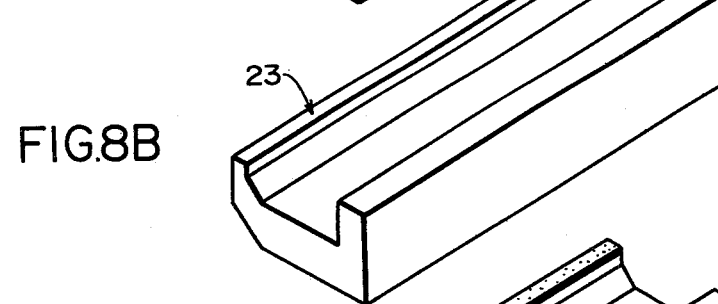
Figure 8C:
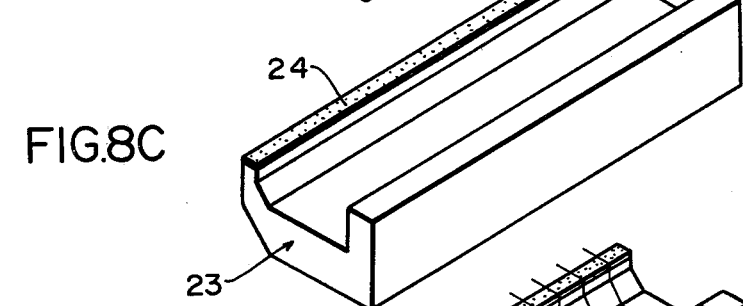

First, a block 22 is formed for side core element, as shown in FIG. 8A. The block 22 is bored and cut to form a core block 23 as shown in FIG. 8B. An Fe-layer 24 is attached to one end surface of the core block 23 with organic adhesive as shown in FIG. 8C. Then, the core block 23 is sliced into numerous side core elements as shown by the dot-dash lines in FIG. 8D.

Figure 9A:
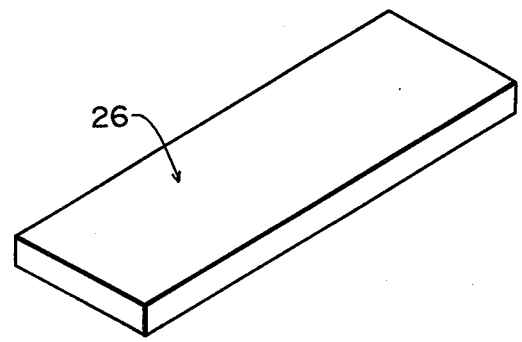
FIG. 9A to FIG. 9C are perspective views showing the manufacturing method of a center core element for the magnetic erasing head in the order of the sequential manufacturing steps.
Figure 9B:
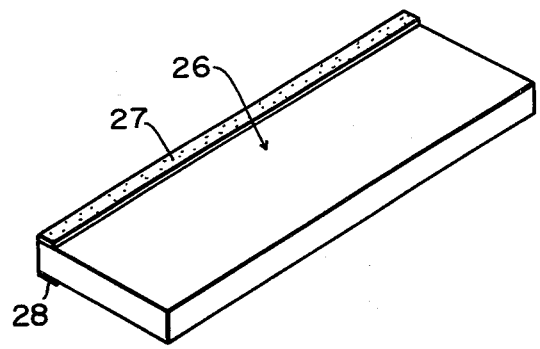

On the other hand, another block 26 is formed for center core element, as shown in FIG. 9A. Fe-layers 27 and 28 are attached to the marginal portions of both of the surfaces of the block 26 with organic adhesive, as shown in FIG. 9B. And the block 26 is sliced into numerous center core elements, as shown by the dot-dash lines in FIG. 9C.

Figure 10:
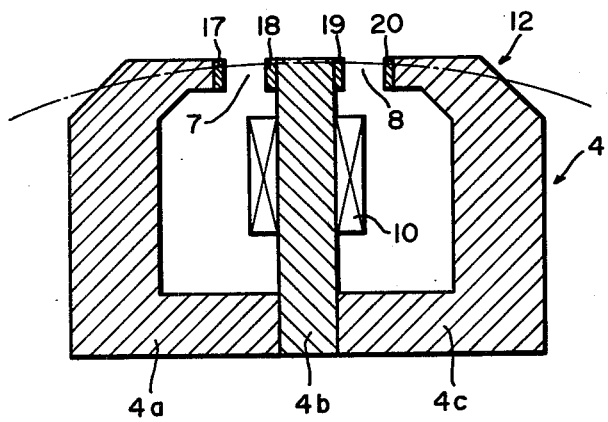
FIG. 10 is a schematic cross-sectional view of a magnetic erasing head produced in the manufacturing method of FIG. 8A to FIG. 8D and FIG. 9A to FIG. 9C.
Figure 8D:
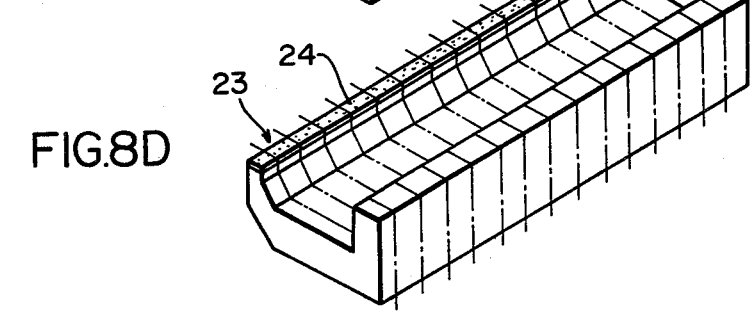
Figure 9C:
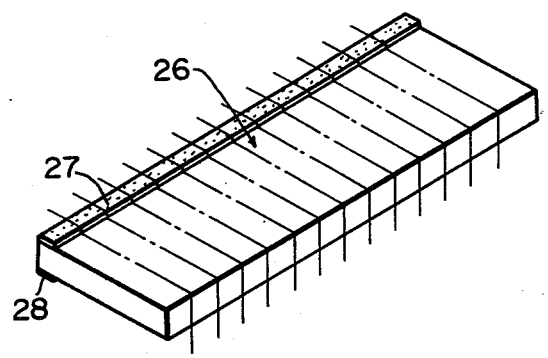

Next, two slices of the slices produced in the step of FIG. 8D and one slice of the slices produced in the step of FIG. 9C are attached to each other to form a core 4 in the manner shown in FIG. 10. The magnetic erasing head 12 includes one center core element 4b, two side core elements 4a and 4c and the energizing coil 10, corresponding to the magnetic erasing head of FIG. 4. In the finishing manufacture, the front surfaces of the magnetic erasing head 12 is polished to curved surfaces shown by the dot-dash line in FIG. 10.

As above described, the magnetic layers 17 to 20 are made of Fe (iron), and the core 4 is made of ferrite. Accordingly, the magnetic layers 17 to 20 and the core 4 are substantially equal to each other in workability, or particularly in polishability, and are superior in malleability and ductility. Accordingly, it is easy to manufacture the magnetic erasing head. Moreover, they have considerable wear resistance, and can always stably contact with the magnetic recording tape.

According to the embodiments of this invention, the Fe-layers with the thickness of 5 to 30$\mu$ having high magnetic flux density and high permeability are attached to the pole faces of the core elements. The core elements are not saturated with magnetic flux. The magnetic flux can be concentrated into the gaps between the core elements. The recorded signals can be erased even from the magnetic recording tape having high coercive force with low power.

Recorded signals can be very efficiently erased from a magnetic recording tape having high coercive force by a conventional DC erasing head or magnet erasing head. However, there is often generated considerable DC noise from such erasing heads. On the other hand, there is generated little noise from the magnetic erasing head of the embodiment of this invention.

In the above embodiments, it is important that the core elements 3b and 4b are arranged between the front gaps 5 and 6, and between the front gaps 7 and 8, respectively. If all of the core element 3b and magnetic layers 14 and 15, or of the core element 4b and magnetic layers 18 and 19 are made of Fe (iron), eddy current loss increases at these portions, and the magnetic flux is dulled in the front gaps 5, 6, 7 and 8. The efficiency is extremely lowered in that case.

While preferred embodiments have beed described, variations thereto will occur to those skilled in the art within the scope of the present inventive concepts which are delineated by the following claims.

Figure 11:
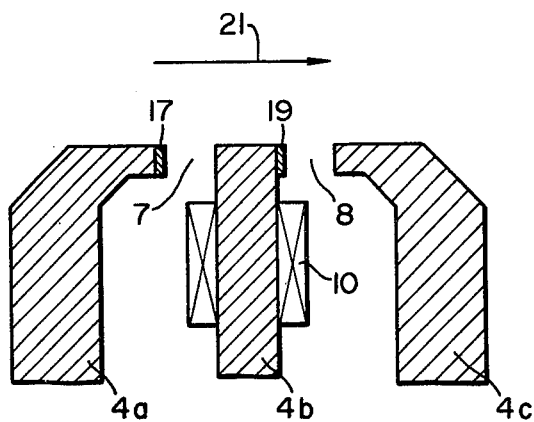
FIG. 11 to FIG. 13 are schematic cross-sectional views of various modifications of the embodiment of this invention.

For example, although the Fe-layers 13 to 20 are attached to all of the pole faces of the core elements 4a, 4b and 4c in the above embodiment, the Fe-layers 17 and 19 may be attached only to the pole face of the core element 4a and one of the pole faces of the core element 4b, in the manner shown in FIG. 11. The magnetic erasing head of FIG. 11 is effective in the case when the magnetic recording tape is transported in the direction shown by the arrow 21. However, the Fe-layer may be further attached to the other of the pole faces of the core element 4b in order to improve the efficiency.

Figure 12:
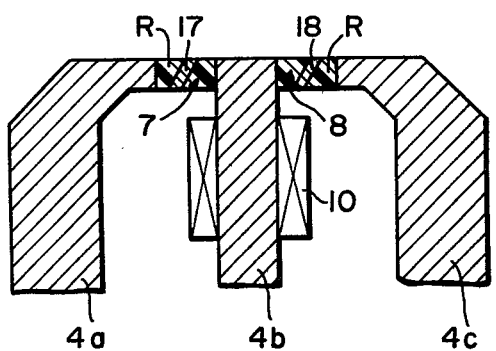
Figure 13:
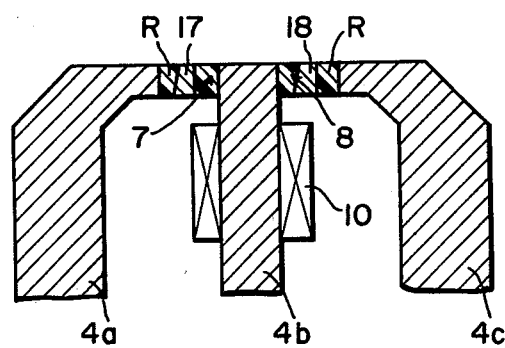

Or the Fe-layers 17 and 18 may be slantly arranged in the front gaps 7 and 8, in the manner shown in FIG. 12 and FIG. 13. The cross-section of the Fe-layers 17 and 18 is trapezoidal in the magnetic erasing head of FIG. 13.

In both of the magnetic erasing heads 12 and 13, the thicknesses of the Fe-layers 17 and 18 are required to be within the range of 5 to 30$\mu$, respectively.

Layers of any other material, instead of the Fe-layers, having high magnetic flux density and high permeability may be used for this invention. For example, PC permalloy ($B_{10}=8000$ gauss, $\mu=1000$), Sendust alloy (Fe-Al-Si system alloy, $B_{10}=8000$ gauss, $\mu=5000$), or amorphous alloy such as $Fe_{80}P_{13}C_7$ (suffix numbers are by mol%) may be used for this invention.

The magnetic flux density $B_{10}$ and permeability of material usable for this invention is more than 5000 gauss, or preferably more than 7000 gauss, and more than 5000, respectively.

According to this invention, the layers of material having high magnetic flux density and high permeability are arranged in the front gaps. Accordingly, magnetic flux can be concentrated in the front gaps without saturation of the core elements. Recorded signals can be effectively erased even from a magnetic recording tape having high coercive force by a magnetic erasing head of this invention.

Moreover, since the thicknesses of the layers are within the range of 5 to 30$\mu$, respectively, the erasing power is very low, and the problems on the generation of heat and noise can be solved by the magnetic erasing head of this invention. The magnetic erasing head of this invention is superior in several performances.

What is claimed is:

1. A magnetic erasing head for erasing recorded signals on a magnetic recording medium which is facing to the front surface of said magnetic erasing head, comprising:
   (A) first, second and third core elements made of ferrite;
   (B) first and second gaps formed between said first and second core elements, and between said second and third core elements, respectively, facing toward said magnetic recording medium;
   (C) one or more magnetic material layers having higher magnetic flux density and higher permeability than the magnetic flux density of said ferrite core elements mounted in said first and second gaps, respectively, said layers having magnetic flux density $B_{10}$ of more than 5000 gauss, permeability $\mu$ of more than 5000, and thicknesses of 5 to 30$\mu$ in the lengthwise direction of said gaps; and
   (D) a winding provided around at least one of said core elements to generate magnetic flux in said core elements by an application of AC current.

2. A magnetic erasing head according to claim 1, in which said magnetic flux density $B_{10}$ of said layers is more than 7000 gauss.

3. A magnetic erasing head according to claim 1, in which said first and third core elements are C-shaped, and said second core element is I-shaped, and said first and third core elements being abutted with said third core element to form an E-shaped core.

4. A magnetic erasing head according to claim 1, in which the total gap length of said first and second gaps is within the range of 50 to 300$\mu$.

5. A magnetic erasing head according to claim 1, in which at least said layers are mounted in said gaps adjacent the edges of said gaps by which portions of said magnetic recording medium initially pass the transporting direction of said magnetic recording medium, in said gaps.

* * * * *